(12) United States Patent
Nelson et al.

(10) Patent No.: US 6,725,219 B2
(45) Date of Patent: Apr. 20, 2004

(54) INTERNET PRESENTATION SYSTEM

(75) Inventors: Steve Nelson, San Jose, CA (US);
Chia-Hsin Li, San Jose, CA (US);
Theodore Douglas Huffmire, San Francisco, CA (US)

(73) Assignee: Seiko Epson Corporation, Tokyo (JP)

( * ) Notice: Subject to any disclaimer, the term of this patent is extended or adjusted under 35 U.S.C. 154(b) by 424 days.

(21) Appl. No.: 09/808,201

(22) Filed: Mar. 13, 2001

(65) Prior Publication Data

US 2002/0174085 A1 Nov. 21, 2002

(51) Int. Cl.⁷ ............................................. G06F 17/30
(52) U.S. Cl. ........................................ 707/10; 707/104.1
(58) Field of Search ........................... 707/1, 10, 104.1, 707/203, 100; 700/9; 345/1–10, 431

(56) References Cited

U.S. PATENT DOCUMENTS

| 5,781,190 A | 7/1998 | Gorbet et al. |
|---|---|---|
| 5,822,525 A | 10/1998 | Tafoya et al. |
| 5,898,819 A | 4/1999 | Austin et al. |
| 6,128,629 A | * 10/2000 | Bretschneider et al. ...... 707/203 |
| 6,510,350 B1 | * 1/2003 | Steen et al. ...................... 700/9 |

OTHER PUBLICATIONS

Sharfman et al (U.S. Publication No. 2002/0026521).*
Bova (U.S. Publication No. 2001/0049681).*

* cited by examiner

*Primary Examiner*—Safet Metjahic
*Assistant Examiner*—Marc Filipczyk
(74) *Attorney, Agent, or Firm*—Rosalio Haro

(57) ABSTRACT

An internet presentation system includes an internet accessible server that permits access to a database of editable and executable presentation files to select users with a specific type of periphery device. The periphery device, or projector, includes a hardware ID used by the server to authenticate the user. The server additionally maintains an administration mode by which select administrators may create and edit template files and color scheme files required, but not editable, by the select users. The server also maintain statistic of the select users and their activities. The administrators use the statistics to target template and color scheme files for deletion and editing.

42 Claims, 2 Drawing Sheets

INTERNET PRESENTATION SYSTEM

BACKGROUND OF THE INVENTION

1. Field of the Invention

The present invention relates to an internet presentation system and more specifically to an interactive web-based utility which enables a user to prepare, revise and show computer-based presentation files over the internet. The system offers a number of advantages over the current way in which a computer presentation is developed, particularly when the presentation is prepared and given in different locations.

2. Description of the Related Art

Today, most users create their presentations on a computer using stand-alone application software. If a desktop computer is used to create a presentation and a different computer, such as a laptop, is then used in connection with a projector to give the presentation, the software for creating the presentation must be installed on both computers. Usually, both computers must have the same version of the software; otherwise, one computer may not be able to correctly read the other's data file. The presentation file must therefore be transferred from the desktop to the laptop, which is typically done using a transferable storage device such as a Zip™ drive or floppy disk, if the presentation file is small enough, or by using a local network. Even after loading the application software onto the laptop and transferring the files, there may be complications in getting the laptop to work with the projector.

Situations may also arise where a user is at, or in route to, a presentation site while a coworker back at the home office needs to make changes to the presentation. Transferring and coordinating changes to the presentation file may be difficult, depending on the circumstances. A File may get corrupted during transfer by e-mail, and may not be reliable. The problems are compiled if the presentation on the desktop computer uses data objects linked to a database not accessible by the notebook computer, so that even if the presentation file is transferred to the laptop computer, the laptop computer will not be able to reproduce the presentation since it does not have access to the database storing the linked data objects.

An attempt to overcome some of these limitations is presented in U.S. Pat. No. 5,781,190 wherein a presentation saving utility attempts to save many of a presentation's attributes into re-installable, presentation packaged. For example, if the original presentation file has data objects linked to a database, the saving utility will replace the links with copies of the current data values. Additionally, a functional copy of the presentation application itself is added to the presentation package. When the presentation is transferred to another computer, such as a laptop computer, the presentation package is re-installed onto the laptop computer. However, since a functional presentation application is included, along with the presentation file, image objects and data objects, the re-installable, presentation package can be very large and may span multiple floppy disks. This not only makes it difficult to transfer, but also complicates management of the presentation since the entire presentation package would be unusable if any of the floppy disks is misplaced. Additionally, this approach does not address the issue of coordinated access to a presentation file by multiple users, such as when a person at a home office needs to edit a presentation that is to be presented by another individual at a different location. Additionally, this approach requires that that both machines be compatible with each other since both must support the same application software.

An object of the present invention is a presentation system and method that facilitates the presentation of a common presentation file by multiple users on multiple remote computing machines.

It is another object of the present invention to facilitate the transfer of an application from one machine to another.

It is a further object of the present invention to remove the need to have a common application software, with a common version release, on all machines that are to run the present file.

It is a further object of the present invention to facility the management of an application file edited by multiple users.

It is a further object of the present invention to facility last minute edits by a local user of a presentation file that is to be presented by a remote user.

SUMMARY OF THE INVENTION

The above objects are met by providing a convenient way in which presentations may be created, edited and given using a web-based utility. The present invention is embodied in a Java-based system in which a user can create a presentation file by accessing a server using a standard web browser. After connecting to a web site, the user navigates to the area designated for creating and editing presentations and logs into the system. Once in the system, the user has access to all of his/her presentations. New presentations may be created and existing ones edited or deleted. Changes are instantly updated.

The present system also includes an administration mode accessible only to select personnel. In administration mode, various system parameters can be set, such as the maximum number and size of presentation files for each user.

A presentation prepared in accordance with the present invention may be given by attaching any computer with a standard web browser to a projector. After logging into a web site, the user first selects a presentation to be shown. Clicking on a hyperlink automatically launches a player written in Java that displays the presentation file, i.e. slide show, in full screen mode.

The present system may also incorporate the player into the firmware of the projector. The firmware would run a small version of the Java Virtual Machine. Projectors could be designed with an LCD panel that lets the user log into the web site and select the presentation to be shown. Since such a system would be network-based, no intermediate computer would be required.

In another aspect of the invention, the web site further restricts access to specific types of projectors or to computers with specific periphery projectors.

The system includes version control which allows multiple users to make changes to the presentation but only one at a time. Before any user can make changes to an existing presentation file, that user must first "check out" the presentation, make changes, then "check in" the file. Changes are reflected immediately so that the database will contain the "new" version of the presentation. In addition, the system will contain a log of all changes, when they were made, and who made them. Thus, a user will be able to revert to a previous version of the presentation if desired.

The system also permits image and audio components to be added to a presentation. Using the software residing on the web site, a user can record his/her voice and add narration to individual slides. This enables a user to prepare a presentation at one location and given at another location without actually traveling to the other location. The user may similarly add an image from the user's computer, or instruct the web site, to access another web site where the user maintains a gallery of images, and retrieve a specific image.

The system further allows a user to print presentation slides directly from a web site.

BRIEF DESCRIPTION OF THE DRAWINGS

In the drawings wherein like reference symbols refer to like parts.

DESCRIPTION OF THE PREFERRED EMBODIMENTS

Figure 1:
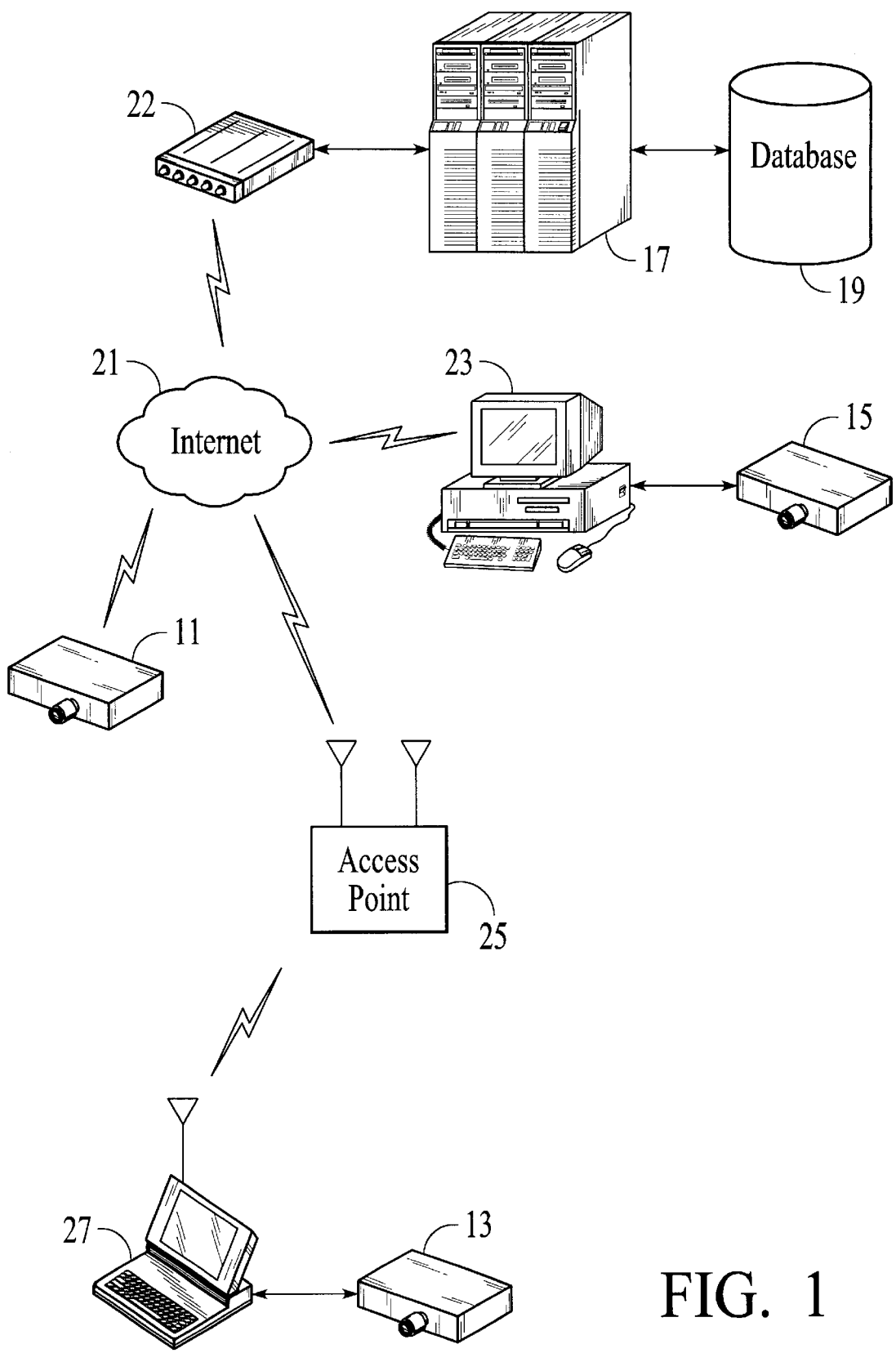
FIG. 1 is a presentation system in accord with the present invention.

The presentation application is made up of two parts: the user mode and the administration mode. Each component is discussed separately. To make presentation software flexible, scalable, portable, and easy-to-use, the present invention is preferably implemented using Java, JDBC, JSP, and X.509 Certificate Security.

Java is preferred since it is a powerful, object-oriented internet programming language that provides platform-independence. Java programs can run on virtually any platform, and most modern internet browsers have the capability to run Java programs. The presentation software uses both Java applets and Java servlets. An applet is a Java program that runs in a client's web browser. A servlet is a Java program that runs on a server. Applets and servlets can communicate with each other using the HTTP protocol.

The presentation software is preferably data-driven, which means that changing a record in the database changes the behavior of the presentation software. This makes the presentation utility very powerful and flexible because it is much easier to change a record in a database than it is to reengineer software, compile it, and test it. Preferably, the present invention makes use of the Java Database Connectivity (JDBC) facilities for easy implementation with existing database software and make the presentation utility a data-driven product. The JDBC:ODBC bridge database driver permits Java programs to access any ODBC data source. ODBC is a technology that allows generic access to dissimilar database systems on a select group of operating system platforms, such as MS Windows™ and some UNIX platforms. This produces a smooth, seamless way for the client to access the database. This bridge allows the server to form SQL statements and send them to the database. SQL is a powerful database language that lets the device experts make complex queries of the data in the database and to update the database with new data. With JDBC, the presentation utility can use any SQL database, from a personal computer size database to an enterprise-wide database.

Preferably, the presentation software also uses Java Server Pages, or JSP. JSP allows Java code to be included as part of HTML pages on a server. This adds power and flexibility to the system because HTML content can be dynamically generated and instantly updated. The Java code in the HTML page does not need to be compiled ahead of time.

As stated above, the present presentation software also preferably utilizes X.509 Certificate Security, which is a security protocol developed for internet applications which uses public key cryptography. This security protocol lets the customer be sure of the source of the internet software he or she has downloaded from the internet before he or she runs it on his or her computer. Certificate Authorities issue X.509 certificates to specific companies, after carefully reviewing the credentials of the company. The X.509 certificate can be used to create a digital signature of the software code. The customer's browser has a mechanism to automatically verify this signature. Once the customer is sure that the software is from the specific company, assuming that he or she trusts that all software from that specific company, he or she will grant the privileges the software requests.

User Mode

With reference to FIG. 1, several devices are shown accessing the Internet 21. Server 17 is shown coupled to the Internet 21 by means of some internet access device 22. Server 17 has direct access to database 19. Several computing devices may gain access to server 17 via the internet 21. Computer 23 has access to the Internet by means of a modem or other internet access device. Laptop computer 27 has wireless access to the internet 21 by means of radio access device 25. Both computer 23 and laptop computer 27 have respective projectors 15 and 13 to respective communication ports, not shown. Projector 11, however, incorporates network access circuitry and is shown to have access to the Internet without the need of an associated external computer.

Preferably, each of computing devices 11, 23 and 27 include an internet browser utility for navigating the Internet 21 and accessing server 17. A user, or client, uses any of computing devices 11, 23 and 27 to log onto server 17 and gain access to database 19.

In order to log onto server 17, however, several criteria should be met. Preferably, server 17 maintains a first record of all authorized users, and associated user passwords. To log on, a user must provide a correct userID and password. Additionally, server 17 preferably also maintains a second record of predefined periphery devices, such as specific projector models. When a personal computer, such ass desktop computer 23 and laptop computer 27, attempt to log onto server 17, server 17 will request information of all periphery devices coupled to computers 23 and 27. Desktop computer 23 would respond to this request by sending an identification sequence identifying projector 15, and laptop computer would respond by sending an identification sequence identifying projector 13. The respective identification sequences are provided by respective projectors 15 and 13, themselves. If the received identification sequences does not match any of the predefined periphery devices stored in the second record, server 17 will deny access to the corresponding computing device regardless of whether a proper userID and password was supplied.

In the case of projector 11, a presentation player, written in Java, is incorporated into its firmware. Since the present system is network-based, projector 11 is all that is needed. A small version of the Java Virtual Machine incorporated into its firmware can support the accessing of a presentation file from server 17.

Figure 2:
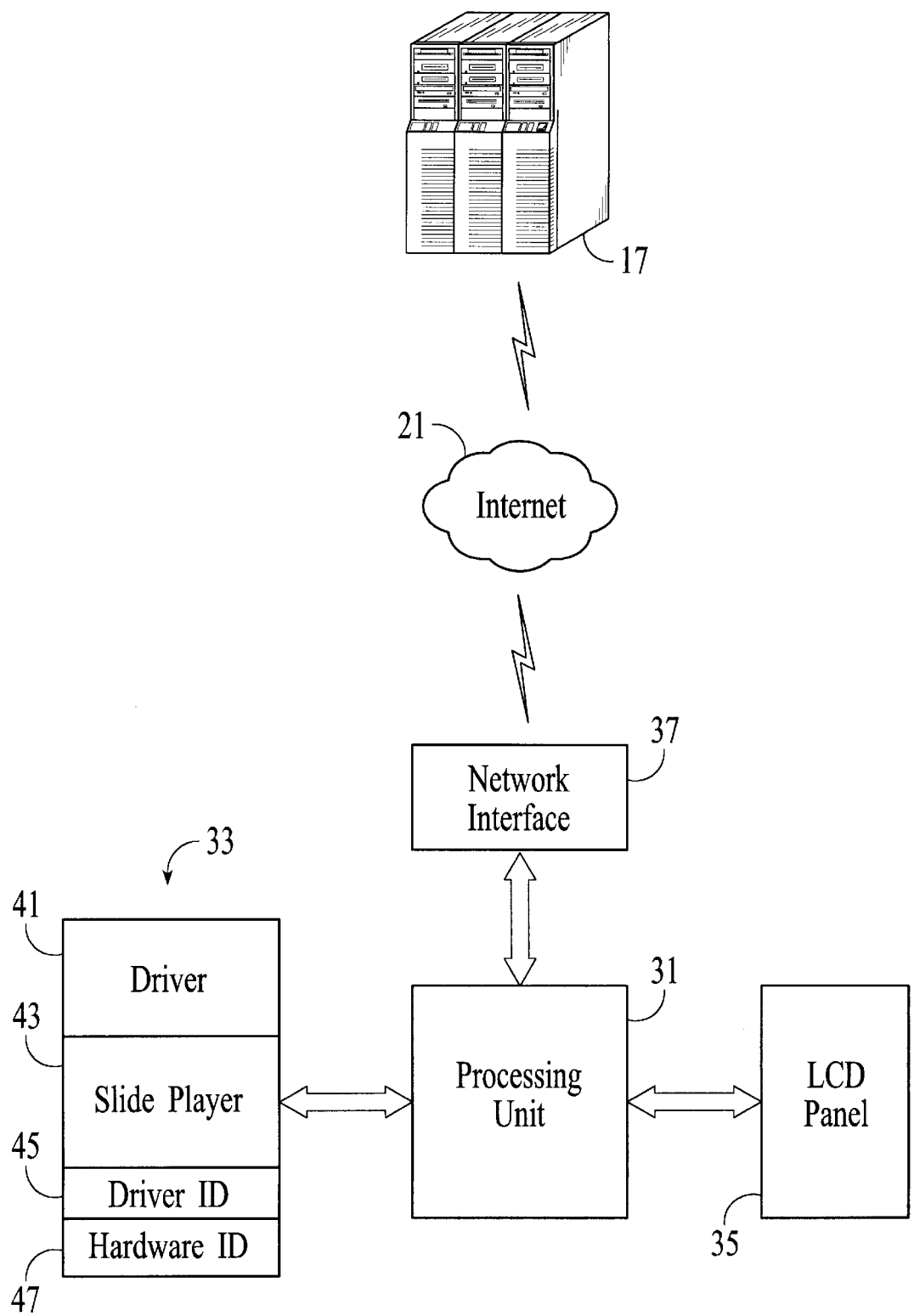
FIG. 2 is block diagram illustrating the interaction of key features within a projector in accordance with the present invention.

With reference to FIG. 2, some of the relevant components of projectors in accord with the present system are shown. Some, or part, of these components may be integrated into any of projectors 11–15, but FIG. 2 illustrates the interrelation of stand-alone projector 11 with server 17. In this exemplary representation, server 17 is shown to incorporate the network access functionality previously provided by device 22 in FIG. 1.

In FIG. 2, a stand-alone projector, such as projector 11, is shown to incorporate a network interface component 37 for accessing the internet 21. Network interface 37 is coupled to a processing unit 31, which may be implemented as a CPU, FPGA, or any other data processing mechanism. As, shown, a stand-alone projector preferably includes an LCD panel 35 for providing a user interface. LCD panel 35 provides an access means for a user to interact directly with the projector, and indirectly with server 17 through the projector.

Processing unit 31 is coupled to memory 33, which is divided into four functional sections 41–47. The functional sections 41–47 may be integrated into a single re-programmable, nonvolatile memory, such as a Flash memory. Alternatively, functional sections 41–47 may be divided into multiple memory modules: in which case it is preferable that at least sections 41 and 45 be reprogrammable, nonvolatile memories. Section 41 holds the driver, which controls the basic input/output functions for the projector. Preferably, this section would also hold the java engine used by processing unit 31 to run a slide player software. Section 43 holds the slide player software, and processing unit 31 uses this section to edit or run a presentation obtained from server 17. As explained earlier, section 41 is reprogrammable, nonvolatile memory, meaning that the driver information may be updated to provided added or smoother functionality to the projector. Therefore, each driver in section 41 is associated with a corresponding Driver ID, which is stored in section 45. Also, the projector maintains a Hardware ID identifying it for comparison with the aforementioned second record listing used by server 17 to authenticate a periphery device. All projectors 11–15 would incorporate a similar Hardware ID memory section.

In practice, a user would submit his/her userID and password to server 17 through LCD panel 35. Before allowing access to the user, however, server 17 would request the hardware ID of the projector, which would respond by transmitting the hardware ID from section 47. If server 17 matches the received hardware ID, as well as the userID and password submitted by the user, then the projector, and thereby the user, is granted access.

In an alternate embodiment, server 17 also maintains driver information for at least some of the periphery devices stored in its second record list of approved periphery devices. In this case, server 17 may also request the driver ID of the periphery device's current driver. The periphery device would respond by transmitting the driver ID from section 45. Using the received Hardware ID and Driver ID, server 17 can determine if the periphery device has the most current driver. If server 17 determines that the driver needs to be updated, a new driver and corresponding new driver ID will be transmitted for storing into respective section 41 and 47.

As stated above, the projector components shown in FIG. 2 are characteristic of a stand-alone projector, such as projector 11, but some of these components are common to periphery projectors 13 and 15. For example, periphery projectors 13 and 15 may not require network interface 37 or LCD Panel 35 since internet access and a user interface if provided via their respective external computers 27 and 23. However, it is preferred that periphery projectors 13 and 15 include at least Hardware ID section 47 for identification by server 17. Driver section 41, slide player section 43, and Driver ID section 45 may be stored in an appropriate storage device, such as a hard drive, of external computers 23 and 27 and serve a similar function. That is, driver 41 controls the input/output communication interaction with an external computer and its associated periphery projector, or other periphery device, and Driver ID 45 is used to identify the Driver version stored in the external computer. The Driver may than be updated by server 17 by comparing the Driver ID provided by the external computer, with the Hardware ID provided by the periphery device, i.e. projector.

Returning to FIG. 1, the user interface is similar for both periphery projectors 13 and 15, and for stand-alone projector 11. The following describes the software interface, and uses terms common to modern menu driven applications, such as "menu", "menu item", "dialog box", "tools", "icon", "Edit" option button, "click on", "OK" option button, "Next" link, "Previous" link, etc, and are considered within the understanding of a person versed in the art. The user's first task is to point his or her browser to the appropriate web site, i.e. server 17. From here, he or she may choose to navigate to the presentation utility area. The first page the user will see is the login page. After logging in, the user will see a list of all her presentations. From here, she can create a new presentation, edit an existing presentation, or delete a presentation. The user will also see how much space she has remaining on the server.

To create a new presentation, the user first clicks on, i.e. selects, the link labeled "Add New Presentation." The user should enter a name for the presentation in the appropriate text area and click OK. The newly created presentation should appear in the presentation list.

The user is now ready to edit the newly created presentation. The user should click on the "Edit" link for the desired presentation. This will show a presentation editor. For new presentations, a select slide template dialog box will appear so that the user can select a template for the first slide.

In the presentation edit mode, a toolbar appears. Below the toolbar is the client area. The client area contains a preview of the current slide. Initially, it shows the first slide of the presentation, which is blank for a new presentation. The user can advance to the next slide or go back to the previous slide by clicking on buttons marked with arrows located below the preview area.

To the left of the client area is preferably a menu applet. This applet shows the steps involved in creating a presentation, such as choosing a color scheme, selecting a slide template, attaching an image to an image component, editing an image, printing the presentation, and getting help. The steps are organized into groups. To move to the next group, the user can click on the "Next" link. To go back to the previous group, the user can click on the "Previous" link.

A "select template" menu item will show a "select slide template" dialog box. This dialog box will allow the user to preview slide templates organized into categories. One of the templates shall be blank (no components). Available templates are controlled in an administration mode. When the user has made her selection, she should click an OK option.

A "choose color scheme" menu item will show the "choose color scheme" dialog box. This dialog box will allow the user to preview several color schemes. The user may apply the color scheme to the current slide or to all slides in the presentation. When the user has made her selection, she should click OK.

Available color schemes are controlled in the administration mode. Text and the borders of components must appear in contrast to the background color. For example, black text on a blue background is not very readable. Yellow text on a white background is not readable either. When the slide is printed, the text and borders of the components must appear black, and the background must appear white. A "select background color" menu item will show a "select background color" dialog box. This dialog box will allow the user to choose a background color for the slide using a "color picker". The user will have the option of applying the background color to the current slide or to all the slides in the presentation. When the user has made her selection, she should click OK.

An "about" menu item will show information about the presentation utilities in the slide preview client area.

An "attach image" menu item will allow the user to attach an image to one or more image components in the slide. If more than one image component exists in the slide, a "select image" dialog box will appear before a "get image" dialog box appears.

An image component does not contain a picture until the user attaches a picture. Before a picture is attached, the image component area is white, with a light gray border and "PHOTO" in light gray text in the middle of the component area. After the picture is attached, the image component client area contains the picture.

To attach an image to a slide, there must be an image component already in the slide.

In the "get image" dialog box, images can be imported from the internet or from a local file. To import an image from a local file, click on a "from file" tool (with the folder icon). This will bring up a file dialog box. To import an image from the internet, one may click on a "from URL" tool (with the computer icon). This will bring up a "Get Image from URL" dialog box. One may then enter the internet address for the image and click the OK button.

While the image is loading, a progress meter in the lower right hand corner of the "get image" dialog box will display the progress of the loading of the image. Status messages are displayed in the lower left hand corner of the "get image" dialog box. After the image is loaded, it will be displayed in the "get image" dialog box. The user should use the rubber rectangle to select the region of the image she desires. After selecting the desired region, the user should click on the "OK" tool. The user can zoom in and zoom out by clicking on appropriate "zoom" tools (tools identified by magnifying lens icons). After the user clicks OK, the image component in the slide preview should contain the selected region of the image.

A "touch image" menu item will allow the user to adjust an image in the slide. If more than one image component exists in the slide, a "select image" dialog box will appear before the "adjust image" dialog box appears. The "adjust image" dialog box will contain the image. The user can zoom in and zoom out by clicking on the "zoom" tools. When the user is finished making changes to the image, she should click on the "close" tool. This tool has a drawing of a yellow door, and it is the leftmost tool. While the program is processing the image, a progress meter in the lower right hand corner of the "adjust image" dialog box will display the progress of the image processing. The user can flip the image horizontally and vertically. The user can also rotate the image 90° clockwise, 90° counterclockwise, and 180°. The user can change the saturation, brightness, contrast, and RGB balance of the image. The user can also sharpen the image.

A "print" menu item will show a "print preview" dialog box. The user can zoom in and out by clicking on buttons labeled "Zoom In" and Zoom Out." The zoom ratio is displayed in the lower right hand corner. The user can select the paper size from the pull down menu. When the user is ready to print, she should click on a button labeled "Print." This will bring up a print dialog. When the user is done printing, she should click a button labeled "Close."

A "help" menu item will show online help for the presentation utilities.

The following table describes some additional tools currently envisioned for the presentation editor:

| Name | Description |
| --- | --- |
| Load Presentation | Loads a different presentation from the server. |
| Save Presentation | Saves the current Presentation to the server. |
| Slide View | Edit individual slides. |
| Thumbnail View | Preview thumbnails of all slides. |
| Slide Show | View the slide show. |
| New Slide | Inserts a new slide after the current slide. |
| Delete Slide | Deletes the current slide. |
| Hide Slide | Omits the current slide from the slide show. |
| Select | Selects an object. |
| Properties | Shows the selected objects' property dialog box. |
| Delete object | Deletes the selected object. |
| Line | Creates a new line object. |
| Rectangle | Creates a new rectangle object. |
| Rounded Rectangle | Creates a new rounded rectangle object. |
| Oval | Creates a new oval object. |
| Polygon | Creates a new polygon object. |
| Text | Creates a new text object. |
| Image | Creates a new image object. |
| Clip Art | Creates a new clip art object. |
| Gradient | Creates a new gradient object. |
| Audio | Creates a new audio component. |
| Bring to Top | Brings the selected object to the top. |
| Send to Bottom | Sends the selected object to the bottom. |
| Flip horizontally | Flips the selected object horizontally. |
| Flip vertically | Flips the selected object vertically. |
| Rotate 180° | Rotates the selected object 180°. |
| Rotate 90° CCW | Rotates the selected object 90° counterclockwise. |
| Rotate 90° clockwise | Rotates the selected object 90° clockwise. |
| Group | Groups the selected objects together. |
| Ungroup | Ungroups the selected object. |
| Align left | Aligns the selected objects to the left. |
| Align center | Aligns the selected objects in the center. |
| Align right | Aligns the selected objects to the right. |
| Align top | Aligns the selected objects on the top. |
| Aiign middle | Aligns the selected objects in the middle. |
| Align bottom | Aligns the selected objects on the bottom. |
| Distribute horizontally | Distributes the selected objects horizontally. |
| Distribute vertically | Distributes the selected objects vertically. |
| Toggle Grid | Turns grid constraining on and off. |
| Show Grid | Toggles between show grid and hide grid. |
| Grid Properties | Brings up the grid properties dialog box. |
| Project | |

The user can save her work by clicking on the "save" tool. This will save the current presentation to server 17, and thereby to database 19. The user can load a different project by clicking on the "load" tool.

There are preferably three views available. "Slide view" lets the user view and edit individual slides. "Thumbnail view" lets the user preview thumbnails of all the slides. In "thumbnail view," double clicking on a thumbnail causes the program to change to "slide view" for the slide that corresponds to that thumbnail. "Slide show view" launches the Java presentation player. Any keystroke or mouse click advances the show by one tick. Each tick of the slide show causes one more component to be displayed based on its sequence number. After all the components of a slide are displayed, the screen is cleared before the first component of the next slide is displayed.

The "insert slide" tool inserts a new slide after the current slide. A "select slide template" dialog box will appear so that the user can select a template for the new slide. The "Delete slide" tool deletes the current slide. The "hide slide" tool omits the current slide from the slide show.

For each slide, each component shall have a sequence order. The sequence number of the object shall be based on the order in which the object was added to the slide. The sequence order determines the order in which the components will be displayed during the slide show. The user will be able to change the order of any particular component by using a pull down menu in the component's property dialog box.

To select a component, click on the "select" tool in the toolbar. Next, click over the component you want to select. The component is selected when nine small squares that mark the component's boundary appear. To select multiple objects, using the "select" tool, click and drag to enclose the rectangle around the desired group of objects, and then release the mouse.

When a component is in the selected state, the user can move it by dragging it. The user can also resize it. When the cursor is over one of the corner squares, she can resize the component both horizontally and vertically. When the cursor is over one of the middle four squares, she can resize the component either vertically or horizontally.

Double clicking on a component brings up that component's property dialog. The user can change the properties of the component by using the component dialog. An alternative to double clicking is to select the component using the "select" tool and then click on the "properties" tool. Every component has a name, and the user can see the name in the component's property dialog.

The user can delete a component by selecting the component and then pressing the "delete" key on her keyboard. An alternative to using the "delete" key is to use the "delete" tool.

The user can insert a component by clicking on the tool that corresponds to the component she wishes to insert. Then, the user must click and drag on the slide preview area to define the boundaries of the component. After the user releases the mouse button, the new component's property dialog will appear, and the user will be able to edit the properties of the new component.

Inserting a polygon object is a little bit different from the other objects. The user must first select the "polygon" tool. Then, the user clicks the mouse one or more times to define the vertices of the polygon. The user defines the last vertex of the polygon by double clicking.

The "text area property" dialog box will have a button that allows the user to add bullets to the text component.

Users will be able to add shapes to their presentations, such as arrows and flow chart symbols by clicking on the "clip art" tool. The "clip art browser" will allow the user to select from a number of shapes organized into categories.

The user can add audio to the current slide by clicking using the "audio" tool. Click and drag to add an audio component to the slide. This will show the "audio" dialog box, which has buttons for play, record, stop, and pause. The "Record" button will record sound from the audio input device. As an alternative, a "from file" button will allow the user to select an audio file. This will show a file dialog box. After the sound file is loaded, the "play" button will play the sound.

Audio components appear on the slide preview as an audio symbol enclosed in a rectangle. The Java presentation player will treat the audio component like any other component. When it is the audio component's turn to be shown during the slide show, the sound will be played.

For each slide, each component has a z-order, which describes the layering of components. The user can bring a component to the top by selecting it and then clicking on the "bring to top" tool. The user can send a component to the bottom by selecting the component and then clicking on the "send to bottom" tool.

The user can flip a selected component horizontally and vertically with the flip tools. Using the rotate tools, the user can rotate a selected component 90° clockwise, 90° counterclockwise, and 180°.

There are several tools for changing the alignment, grouping, or distribution of an object or group of objects. The "group" tool groups multiple selected objects together. The "Ungroup" tool ungroups a previously grouped object. The align left", "align center", align right", align top", align middle", and "align bottom" tools align multiple selected objects. The "distribute horizontally" and "distribute vertically" tools space multiple selected objects apart evenly.

The grid feature allows more accurate mouse inputs. The user can turn on the grid by clicking on the "toggle grid" tool. The user can show the grid by clicking on the "show grid" tool. The user can change the grid spacing by clicking on the "grid properties" tool. This will show the "grid options" dialog box. The user should select the grid spacing from the list box and click OK.

Administration Mode

The administration mode of the presentation system allows select individuals, acting as administrators, to instantly update the user database from any computer in the world with a standard web browser and a connection to the internet. One or more administrators with a userid and password can access administration mode of server 17. These administrators would be employees of the organization maintaining the presentation software on server 17.

The user Interface for the administration mode is as follows. Only an authorized administrator with a userid and password can access the administration mode. The first thing the administrator must do is access the login page and enter his or her userid and password.

Every user is assigned a user class. Different classes of users have different storage limits on the server for their presentations. The class assigned to a particular user depends on things such as whether the user purchased a specific periphery device, or projector, or other hardware.

After logging in, the administrator should click on the appropriate link to get to the user class list. The administrator can add a new user class by clicking a link under a user class list labeled "Add New User Class." The administrator should enter the name of the class in the appropriate text area and enter a storage limit for that class using a pull down menu. When the administrator has finished, he should click OK.

After logging in, the administrator should click on an appropriate link to get to a user list. The user list shows the full name and userid of every user, sorted by class and then alphabetically by last name. The current storage in use and storage limits are also displayed. Under the user list, the administrator can click the link labeled "Add New User." The administrator must then enter the user's full name and assign the user a userid and password in appropriate text areas. The administrator must also select a user class from the user class pull down menu. For each entry in the user list, there are two operations: Edit and Delete. The administrator can edit the settings of an individual user by clicking on the Edit link for that user. The administrator can delete a user by clicking on the Delete link for that user.

The administrator can add and remove slide templates from database 19. These slide templates contain components arranged in a typical way. This makes it easier for the user to create presentations. One of the templates should be blank, in case the user doesn't like any of the templates. The text components should contain default text or no text at all.

The administrator may create new slide templates. To create a new slide template, the administrator must first create a slide template size by clicking on a "Create New Template Size" option under a Template Size List. The administrtor then enters a name, description, width, and height in appropriate fields, and clicks an "Add" option.

To create a new page layout for the newly created template size, the administrator clicks a link "Page Layout List" in the Template Size List, and selects a "Create New Page Layout" under the Page Layout List. The administrator should also select a paper size and click "Add".

From the Page Layout List, the administrator may edit the page layout by clicking "Edit Layout" for the paper size just selected. This will show a Page Layout Editor. On can then use the fixed ratio rectangle tool to determine how this template will print. The fixed ratio rectangle property dialog box lets the administrator specify a precise x, y, width, and height.

The administrator should also create a template category. To accomplish this, the administrator selects "Add New Category" under the Template Category List, enters a category name and description, and clicks "Add".

To create a new template, the administrator selects "List Templates" in the category list for the category to which the administrator wishes to add the new template. Under the Template List, one clicks "create New Template," enters a name and description, selects a layout from the pull down menu, and clicks "Add." One may edit a newly created template, by clicking an "Edit Contents" option. This will show a Template Editor. On may use the Template Editor to edit the template, and click "Save" when done.

The administrator must export the templates using an Export function, so that they will be available to the users.

The administrator can control the available color schemes available to users by using a color scheme administration area. To create a new color scheme, the administrator clicks "Add New Color Scheme" from the Color Scheme list, enters a name and description in the appropriate text areas, and clicks "Add".

To edit a created color scheme, one clicks on the Edit link that corresponds to the color scheme that one wants to edit. This will show a color scheme editor, which permits one to assign color options to specific slide components. The administrator must export the color schemes so that they are available to the users.

The present system also allows server 17 to collect valuable, real-time statistics about the behavior of its clients online, i.e. users, at no additional cost. To view these statistics, an administrator should click on the User Statistics link after logging in.

While users create and edit presentations, the presentation utility server 17 can automatically collect information about the user. For example, the server can determine the customer's username, IP address, hostname, and language. This information can be stored in database 19 and later accessed in administration mode. The data can be displayed in table format. The system can keep track of the number of times each user has accessed the presentation utilities. Each time the user accesses the presentation utilities, the access counter for that user is incremented by one. The list can be displayed in sorted order from the most active users to the least active users.

Server 17 may also collect information about the most popular slide templates and color schemes. The number of times each template or color scheme is accessed can be displayed in sorted order. The number of times each template has been printed can also be displayed in sorted order. The most popular templates and color schemes might be expanded, while the less popular templates and color schemes could be eliminated.

What is claimed is:

1. An Internet presentation system comprising:
   a presentation application for creating and editing presentation files;
   a first remote storage device for storing said presentation application and said presentation files, said first remote storage device being accessible over the Internet and permitting access under a user mode of operation and an administration mode of operation;
   a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;
   an administration access device for accessing said first remote storage device under said administration mode of operation, said first remote storage device permitting the removal, addition, and edit of said slide template files under said administration mode of operation
   wherein the creating of said presentation files requires the use of at least one of a predefined group of color scheme files restricting color selections for specific components within a slide, said color scheme files not being editable under said user mode of operation;
   said first remote storage device permitting the removal, addition, and edit of said color scheme files under said administration mode of operation.

2. The Internet presentation system of claim 1, wherein said administration access device incorporates a web-based utility and accesses said first remote storage device over the Internet.

3. The Internet presentation system of claim 1, wherein said first remote storage device automatically collects information of said user access devices that accesses it under said user mode of operation.

4. The Internet presentation system of claim 3, wherein said collected information includes the username, IP address, hostname, and language of said user access device, said information being stored in a database for later access by said administration access device under said administration mode of operation.

5. The Internet presentation system of claim 4, wherein said collected information further includes the number of times said user access devices accesses said presentation application.

6. The Internet presentation system of claim 3, wherein said collected information includes the number of times each of said slide template files is accessed in the creation of presentation files, said information being stored in a database for later access by said administration access device.

7. The Internet presentation system of claim 6, wherein the edit and removal of slide template files is determined by said collected information.

8. The Internet presentation of system of claim 1 wherein said presentation application is a Java-based utility.

9. The Internet presentation system of claim 1, wherein said user access device is one of a plurality of computing devices accessing said first remote storage device over the Internet in said user mode of operation.

10. The Internet presentation system of claim 9, wherein said plurality of computing devices are any of a personal digital assistant, a projector device, and a personal computer system.

11. The Internet presentation system of claim 10, wherein said projector device includes a presentation player incorporated into firmware.

12. The Internet presentation system of claim 11 wherein said projector device further includes an LCD panel that permits a user to log onto said first remote storage device over the Internet.

13. The Internet presentation system of claim 10, wherein each of said plurality of computing devices accesses said presentation files in view-only option by default and requires a permission request to said first remote storage device prior to any presentation file being edited, said first remote storage device maintaining a viewable record of all computing devices who gain permission to edit a presentation file.

14. The Internet presentation system of claim 13 wherein a user access device granted edit permission to modify a presentation file must relinquish its edit permission before another user access device may gain edit permission to modify the same presentation file.

15. The Internet presentation system of claim 14 wherein modification to said presentation files are recorded as changes to a database file within said remote storage device.

16. The Internet presentation system of claim 1, wherein said administration access device is further effective for creating a plurality of user classes with different storage limits on said first remote server;
   said user access device being one a plurality of user access devices accessing said remote storage device under said user mode of operation, said plurality of user access devices being divided into said user classes as determined by said administration access device.

17. The Internet presentation system of claim 16, wherein said administration access device is further effective for assigning specific amounts of storage space to respective member user access devices within each user class.

18. The Internet presentation of system of claim 17, wherein said administration access device is further effective for naming said user classes.

19. An Internet presentation system comprising:
   a presentation application for creating and editing presentation files;
   a first remote storage device for storing said presentation application and said presentation files, said first remote storage device being accessible over the Internet and permitting access under a user mode of operation and an administration mode of operation;
   a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;
   an administration access device for accessing said first remote storage device under said administration mode of operation, said first remote storage device permitting the removal, addition, and edit of said slide template files under said administration mode of operation;
   wherein said user access device is one of a plurality of computing devices accessing said first remote storage device over the Internet in said user mode of operation, and said plurality of computing devices are any of a personal digital assistant, a projector device, and a personal computer system;
   wherein said personal computer system includes a periphery computing device, said periphery computing device having a storage location for storing an ID sequence identifying said periphery computing device;
   said first remote storage device further maintaining a record of hardware identification codes identifying a predetermined list of periphery computing devices;
   wherein said personal computer system transmits said ID sequence to said first remote storage device in response to said first remote storage device requesting information of periphery devices coupled to said personal computer system; and
   wherein said first remote storage device denies access to said personal computer system in response to said ID sequence not matching one of said hardware identification codes.

20. A data transfer system comprising:
   a presentation application for creating and editing presentation files;
   a first remote storage device for storing said presentation application and said presentation files, said first remote storage device being accessible over the Internet and permitting access under a user mode of operation and an administration mode of operation;
   a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;
   an administration access device for accessing said first remote storage device under said administration mode of operation, said first remote storage device permitting the removal, addition, and edit of said slide template files under said administration mode of operation;
   wherein said user access device is one of a plurality of computing devices accessing said first remote storage device over the Internet in said user mode of operation, and said plurality of computing devices are any of a personal digital assistant, a projector device, and a personal computer system;
   wherein each of said plurality of computing devices accesses said presentation files in view-only option by default and requires a permission request to said first remote storage device prior to any presentation file being edited, said first remote storage device maintaining a viewable record of all computing devices who gain permission to edit a presentation file;
   access device granted edit permission to modify a presentation file must relinquish its edit permission before another user access device may gain edit permission to modify the same presentation file;

wherein a user access device granted edit permission to modify a presentation file also has access to a second remote storage device, said second remote storage device being accessible via the Internet and storing at least one image file, said user access device adding said image to said presentation file by requesting said first remote storage device to retrieve said image from said second remote storage device.

21. An Internet presentation method comprising:

providing a presentation application for creating and editing presentation files;

providing a first remote storage device for storing said presentation application and said presentation files;

making said first remote storage device accessible over the Internet and permitting access to said first remote storage device under a user mode of operation and an administration mode of operation;

providing a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;

providing an administration access device for accessing said first remote storage device under said administration mode of operation, said first remote storage device permitting the removal, addition, and edit of said slide template files under said administration mode of operation;

wherein the creating of said presentation files requires the use of at least one of a predefined group of color scheme files restricting color selections for specific components within a slide, said color scheme files not being editable under said user mode of operation;

said first remote storage device permitting the removal, addition, and edit of said color scheme files under said administration mode of operation.

22. The Internet presentation method of claim 21, wherein said administration access device incorporates a web-based utility and accesses said first remote storage device over the Internet.

23. The Internet presentation method of claim 21, wherein said first remote storage device automatically collects information on said user access device accessing it under said user mode of operation.

24. The Internet presentation method of claim 23, wherein said collected information includes the username, IP address, hostname, and language of said user access device, said information being stored in a database for later access by said administration access device under said administration mode of operation.

25. The Internet presentation method of claim 24, wherein said collected information further includes the number of times said user access devices accesses said presentation application.

26. The Internet presentation method of claim 23, wherein said collected information includes the number of times each of said slide template files is accessed in the creation of presentation files, said information being stored in a database for later access by said administration access device.

27. The Internet presentation method of claim 26, wherein the edit and removal of slide template files is determined by said collected information.

28. The Internet presentation of method of claim 21 wherein said presentation application is a Java-based utility.

29. The Internet presentation method of claim 21, wherein said user access device is one of a plurality of computing devices being given access to said first remote storage device over the Internet in said user mode of operation.

30. The Internet presentation method of claim 29, wherein said plurality of computing devices are any of a personal digital assistant, a projector device, and a personal computer system.

31. The Internet presentation method of claim 30, wherein said projector device executes a presentation player in firmware.

32. The Internet presentation method of claim 31, wherein said projector device further provides an LCD panel to permit a user to log onto said first remote storage device over the Internet.

33. The Internet presentation method of claim 30, wherein each of said plurality of computing devices accesses said presentation files in view-only option by default and requires a permission request to said first remote storage device prior to any presentation file being edited, said first remote storage device maintaining a viewable record of all computing devices who gain permission to edit a presentation file.

34. The Internet presentation method of claim 33 wherein a user access device granted edit permission to modify a presentation file must relinquish its edit permission before another user access device may gain edit permission to modify the same presentation file.

35. The Internet presentation method of claim 34 wherein modification to said presentation files are recorded as changes to a database file within said remote storage device.

36. The Internet presentation method of claim 21, wherein said administration access device is used to create a plurality of user classes with different storage limits on said first remote server;

said user access device being one a plurality of user access devices accessing said remote storage device under said user mode of operation, and said plurality of user access devices are divided into said user classes as determined by said administration access device.

37. The Internet presentation method of claim 36, wherein said administration access device is used for assigning specific amounts of storage space to respective member user access devices within each user class.

38. The Internet presentation of method of claim 37, wherein said administration access device is further used for naming said user classes.

39. An Internet presentation method comprising:

providing a presentation application for creating and editing presentation files;

providing a first remote storage device for storing said presentation application and said presentation files;

making said first remote storage device accessible over the Internet and permitting access to said first remote storage device under a user mode of operation and an administration mode of operation;

providing a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;

providing an administration access device for accessing said first remote storage device under said administration mode of operation, said first remote storage device permitting the removal, addition, and edit of said slide template files under said administration mode of operation.

wherein said user access device is one of a plurality of computing devices being given access to said first remote storage device over the Internet in said user mode of operation, and said plurality of computing devices are any of a personal digital assistant, a projector device, and a personal computer system;

said Internet presentation method further providing a periphery computing device within said personal computer system, said periphery computing device storing an ID sequence identifying said periphery computing device;

said first remote storage device further maintaining a record of hardware identification codes identifying a predetermined list of periphery computing devices;

wherein said personal computer system transmits said ID sequence to said first remote storage device in response to said first remote storage device requesting information of periphery devices coupled to said personal computer system; and wherein said first remote storage device denies access to said personal computer system in response to said ID sequence not matching one of said hardware identification codes.

40. A data transfer method, comprising:

providing a presentation application for creating and editing presentation files;

providing a first remote storage device for storing said presentation application and said presentation files;

making said first remote storage device accessible over the Internet and permitting access to said first remote storage device under a user mode of operation and an administration mode of operation;

providing a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;

providing an administration access device for accessing said first remote storage device under said administration mode of operation, said first remote storage device permitting the removal, addition, and edit of said slide template files under said administration mode of operation.

wherein said user access device is one of a plurality of computing devices being given access to said first remote storage device over the Internet in said user mode of operation, and said plurality of computing devices are any of a personal digital assistant, a projector device, and a personal computer system;

wherein each of said plurality of computing devices accesses said presentation files in view-only option by default and requires a permission request to said first remote storage device prior to any presentation file being edited, said first remote storage device maintaining a viewable record of all computing devices who gain permission to edit a presentation file;

wherein modification to said presentation files are recorded as changes to a database file within said remote storage device;

wherein a user access device granted edit permission to modify a presentation file is further given access to a second remote storage device, said second remote storage device being accessible via the Internet and storing at least one image file, said user access device adding said image to said presentation file by requesting said first remote storage device to retrieve said image from said second remote storage device.

41. An Internet presentation system comprising:

a presentation application for creating and editing presentation files;

a first remote storage device for storing said presentation application and said presentation files, said first remote storage device being accessible over the Internet and permitting access under a user mode of operation and an administration mode of operation;

a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;

an administration access device for accessing said first remote storage device under said administration mode of operation, said first remote storage device permitting the removal, addition, and edit of said slide template files under said administration mode of operation;

wherein said first remote storage device automatically collects information of said user access device that accesses it under said user mode of operation;

wherein said collected information includes the number of times each of said slide template files is accessed in the creation of presentation files, said information being stored in a database for later access by said administration access device; and wherein the edit and removal of slide template files is determined by said collected information.

42. An Internet presentation system comprising:

a presentation application for creating and editing presentation files;

a first remote storage device for storing said presentation application and said presentation files, said first remote storage device being accessible over the Internet and permitting access under a user mode of operation and an administration mode of operation;

a user access device incorporating a web-based utility for accessing said presentation application over the Internet under said user mode of operation, said first remote storage device permitting the running, creating and editing of said presentation files under said user mode of operation, the creation of said presentation files requiring the utilization of at least one of a predefined group of slide template files containing component arrangement information, said template files not being editable under said user mode of operation;

an administration access device for accessing said first remote storage device under said administration mode of operation, said first remote storage device permitting the removal, addition, and edit of said slide template files under said administration mode of operation;

wherein said administration access device is further effective for creating a plurality of user classes with different storage limits on said first remote server;

said user access device being one a plurality of user access devices accessing said remote storage device under said user mode of operation, said plurality of user access devices being divided into said user classes as determined by said administration access device, wherein the storage space limit specified for each of said plurality of user access devices is determine by the class to which it belongs.

* * * * *